(12) United States Patent
Tamaki

(10) Patent No.: US 11,996,730 B2
(45) Date of Patent: May 28, 2024

(54) BACKUP POWER SUPPLY DEVICE

(71) Applicant: FDK CORPORATION, Tokyo (JP)

(72) Inventor: Katsuhiko Tamaki, Tokyo (JP)

(73) Assignee: FDK CORPORATION, Tokyo (JP)

( * ) Notice: Subject to any disclaimer, the term of this patent is extended or adjusted under 35 U.S.C. 154(b) by 37 days.

(21) Appl. No.: 17/999,636

(22) PCT Filed: Apr. 30, 2021

(86) PCT No.: PCT/JP2021/017150
§ 371 (c)(1),
(2) Date: Nov. 22, 2022

(87) PCT Pub. No.: WO2021/241136
PCT Pub. Date: Dec. 2, 2021

(65) Prior Publication Data
US 2023/0238824 A1 Jul. 27, 2023

(30) Foreign Application Priority Data
May 26, 2020 (JP) .................................. 2020-091527

(51) Int. Cl.
*H02J 9/06* (2006.01)
*H01M 10/30* (2006.01)
(Continued)

(52) U.S. Cl.
CPC ............. *H02J 9/061* (2013.01); *H01M 10/30* (2013.01); *H01M 10/46* (2013.01); *H02J 7/0013* (2013.01); *H02J 7/007182* (2020.01)

(58) Field of Classification Search
CPC .... H02J 9/061; H02J 7/007182; H02J 7/0013; H01M 10/30; H01M 10/46
(Continued)

(56) References Cited

U.S. PATENT DOCUMENTS

| | | | |
|---|---|---|---|
| 11,183,854 B1* | 11/2021 | Dong | H02J 7/0013 |
| 2017/0187234 A1* | 6/2017 | Harada | H02J 7/0068 |
| 2019/0273391 A1* | 9/2019 | Miller | H02J 7/0013 |

FOREIGN PATENT DOCUMENTS

| | | |
|---|---|---|
| JP | 2012130158 A | 7/2012 |
| JP | 2012135179 A | 7/2012 |

(Continued)

OTHER PUBLICATIONS

International Search Report and Written Opinion dated Jul. 13, 2021, for corresponding PCT Application No. PCT/JP2021/017150.
(Continued)

*Primary Examiner* — Rexford N Barnie
*Assistant Examiner* — Swarna N Chowdhuri
(74) *Attorney, Agent, or Firm* — Kinney & Lange, P.A.

(57) ABSTRACT

A backup power supply device having a short charging time is provided. The backup power supply device for supplying power when a main power supply is under a power failure includes first and second battery packs connected in parallel, a charging circuit for charging the first and second battery packs, first and second discharging switches for causing the first and second battery packs to discharge to the load device respectively, and a control unit. The control unit compares the battery voltages of the first and second battery packs with an output voltage from the main power supply. The control unit sets the first and second discharging switches to ON when the battery voltages are lower than the output voltage. When the battery voltage of the battery pack exceeds the output voltage of the main power supply due to charging, the control unit sets the first discharging switch and the second discharging switch to OFF. Thereafter, after the first and second battery packs are fully charged, the control unit switches the first and second discharging switches to ON
(Continued)

when the battery voltage has dropped to a dischargeable upper limit voltage.

3 Claims, 2 Drawing Sheets

(51) Int. Cl.
    *H01M 10/46*     (2006.01)
    *H02J 7/00*     (2006.01)

(58) Field of Classification Search
    USPC .......................................................... 307/66
    See application file for complete search history.

(56) References Cited

FOREIGN PATENT DOCUMENTS

| | | |
|---|---|---|
| JP | 2013126331 A | 6/2013 |
| JP | 2016010250 A | 1/2016 |
| WO | 0209255 A1 | 1/2002 |

OTHER PUBLICATIONS

Extended European Search Report dated Nov. 2, 2023, for corresponding European Application No. 21811989.9.

\* cited by examiner

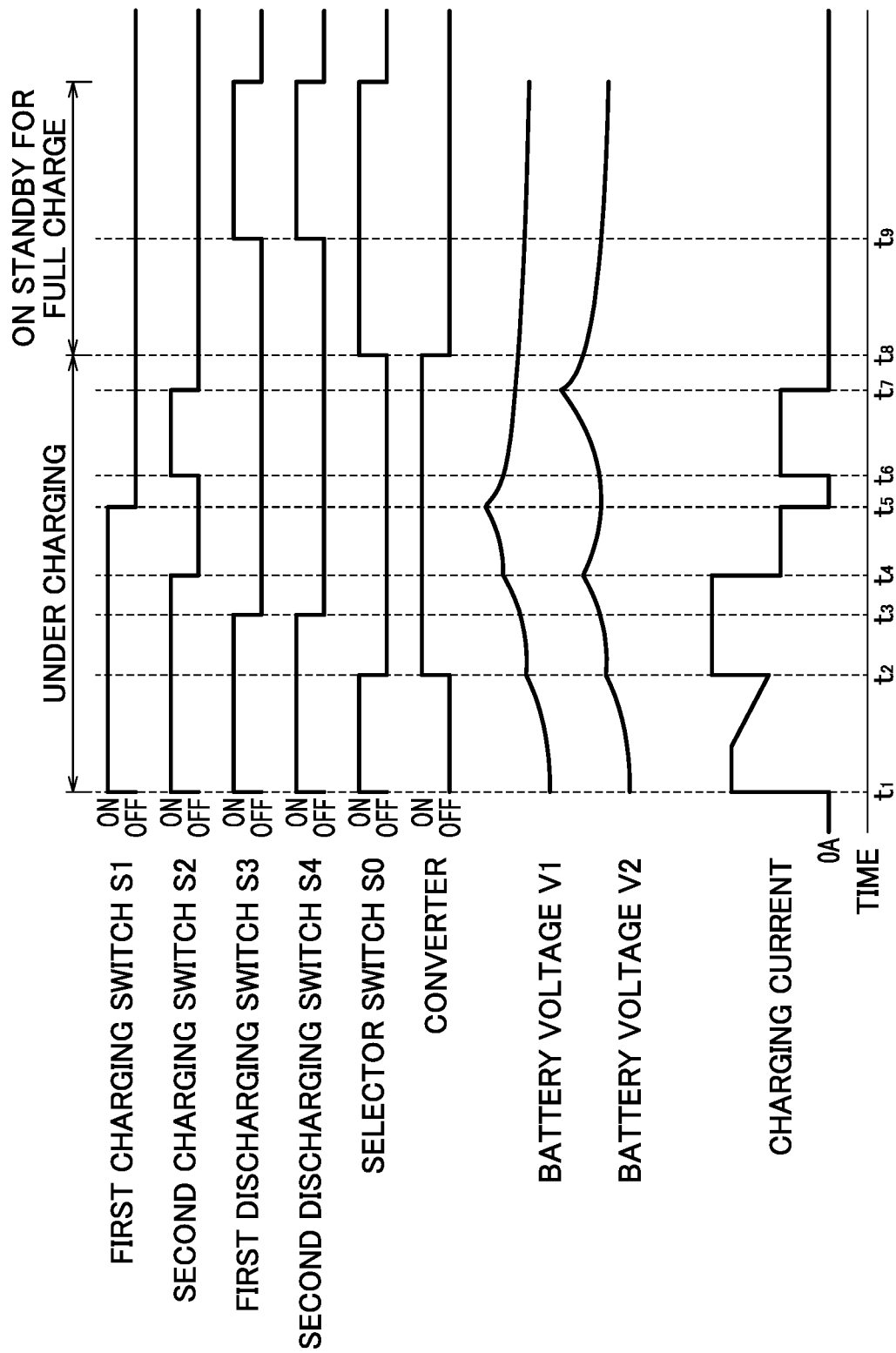

BACKUP POWER SUPPLY DEVICE

CROSS-REFERENCE TO RELATED APPLICATION(S)

This application is the national phase of PCT Application No. PCT/JP2021/017150 filed on Apr. 30, 2021, which claims priority to Japanese Application No. 2020-091527 filed on May 26, 2020, the contents of which are incorporated herein by reference in their entirety.

BACKGROUND

Technical Field

The present disclosure relates to a backup power supply device.

Background Art

There exists a backup power supply device for supplying power to a load device, which is being powered from a commercial power source, in place of the commercial power source in the event of a power failure. When an output switch to the load device in the backup power supply device is to be turned on after a power failure is detected, there is a moment when power supply to the load device is interrupted.

In this respect, there also exists a device which keeps an output switch to a load device in an ON-state during charging of a battery unit in the backup power supply device or while being on standby after the battery unit has been fully charged so as to prevent power supply to the load device from being interrupted even for a moment when a power failure occurs.

However, there is a case where a voltage input from the outside to the battery unit in the backup power supply device is insufficient as a full charge voltage for fully charging the battery unit. Therefore, a boosting DC/DC converter may in some cases be provided in the backup power supply device to boost an input voltage and apply the boosted input voltage to the battery unit. In this case, when the output switch to the load device is being turned on at all times, the battery voltage of the battery unit may increase to be higher than the voltage of an input line to the load device, and thus the battery voltage of the battery unit may directly be applied to the load device.

Therefore, when a backup power supply device includes a plurality of battery units, a method is adopted in which the battery units is divided into two groups, one group is kept at a voltage which can be output to the load device without being charged while the other group is being charged, and then the output switch is turned on. This method makes it possible to ensure that the power supply to the load device is not interrupted even for a moment under a power failure.

However, the above method tends to increase the charging time of the overall device.

An object of the present disclosure, which has been made in view of such a problem, is to provide a backup power supply device in which charging time is shortened.

SUMMARY

A backup power supply device according to a first aspect of the present disclosure is a backup power supply device for supplying power to a load device when power supply from a main power supply to the load device stops, comprising: first and second battery packs each including a secondary battery cell and connected in parallel to each other; a charging circuit for charging the first and second battery packs with power from the main power supply; a first discharging switch that connects and discharges the first battery pack to the load device; a second discharging switch that connects and discharges the second battery pack to the load device; and a control unit for controlling the charging circuit and the first and second discharging switches, wherein the control unit includes comparison means for comparing a first battery voltage of the first battery pack, a second battery voltage of the second battery pack, and an output voltage from the main power supply. And when the first battery voltage and the second battery voltage are lower than the output voltage, the control unit sets the first discharging switch and the second discharging switch to an ON-state. When the first battery voltage exceeds the output voltage of the main power supply due to charging, the control unit sets the first discharging switch and the second discharging switch to an OFF-state to continue charging of the first battery pack. When the first battery voltage exceeds the dischargeable upper limit voltage higher than the output voltage due to charging, the control unit continues the charging of the first battery pack without charging the second battery pack, and stops the charging of the first battery pack when the first battery voltage reaches a full charge voltage higher than the upper limit voltage. Then, the control unit starts charging of the second battery pack after the first battery voltage has fallen below the upper limit voltage, and stops the charging of the second battery pack when the second battery voltage reaches the full charge voltage. And the control unit switches the first and second discharging switches to ON after the second battery voltage has fallen below the output voltage.

With the above configuration, when both the first battery voltage of the first battery pack and the second battery voltage of the second battery pack are lower than the output voltage of the main power supply, both the first and second discharging switches are set to ON. Therefore, if the power supply from the main power supply stops, it is possible to supply power to the load device without interruption.

Further, when the first battery voltage of the first battery pack being charged exceeds the output voltage, both the discharging switches are set to OFF. In particular, when the battery voltage of the first battery pack exceeds the dischargeable upper limit voltage, the charging of the first battery pack is continued. However, the battery voltage of the second battery pack is maintained to be equal to or less than the upper limit voltage without charging the second charging pack in preparation for a power failure of the main power supply. When both the first and second battery packs are fully charged and then fall below the voltage of the main power supply, both the first and second discharging switches are switched to an ON-state. In this way, while the battery voltage of the battery pack is higher than the output voltage of the main power supply, the discharging switch is kept off. Therefore, if power supply from the main power supply is not interrupted, discharging from the battery pack to the load device is not conducted, so that the charging time of the overall backup power supply device is shortened.

In the present disclosure, "charging time" is a time from the time when the backup power supply device is connected to the main power supply to start charging of the battery unit to the time when each battery pack constituting the battery unit is fully charged to set all the battery packs to be in a standby state in which they can discharge to the load device.

A second aspect of the present disclosure further comprises a discharging resistor for forcibly dropping the battery voltage of the fully-charged first battery pack or second battery pack from the full charge voltage to the upper limit voltage in the first aspect. With this configuration, the battery pack which has been charged to the full charge voltage higher than the dischargeable upper limit voltage is forcibly discharged using the discharging resistor, whereby it is possible to drop the battery voltage thereof to the voltage of the main power supply or less in a shorter time as compared with self-discharge. Therefore, the charging time of the overall backup power supply device is shortened.

According to a third aspect of the present disclosure, the secondary battery cell is a nickel-hydrogen battery in the first or second aspect. When the secondary battery cell is a nickel-hydrogen battery, in order to fully charge the secondary battery cell, it is necessary to fully charge the secondary battery cell at a voltage higher than the rated voltage of the secondary battery cell. Therefore, the charging time of the overall backup power supply device can be shortened by setting the first and second discharging switches to OFF from the time when the battery voltage exceeds the output voltage of the main power supply until the battery pack has been fully charged and then drops to be equal to the output voltage or less again.

According to the backup power supply device of the present disclosure, the time required to fully charge the backup power supply device can be shortened.

BRIEF DESCRIPTION OF THE DRAWINGS

FIG. 2 shows a time chart of an operation of each switch, a battery voltage, and a charging current of the backup power supply device shown in FIG. 1.

DETAILED DESCRIPTION

Figure 1:
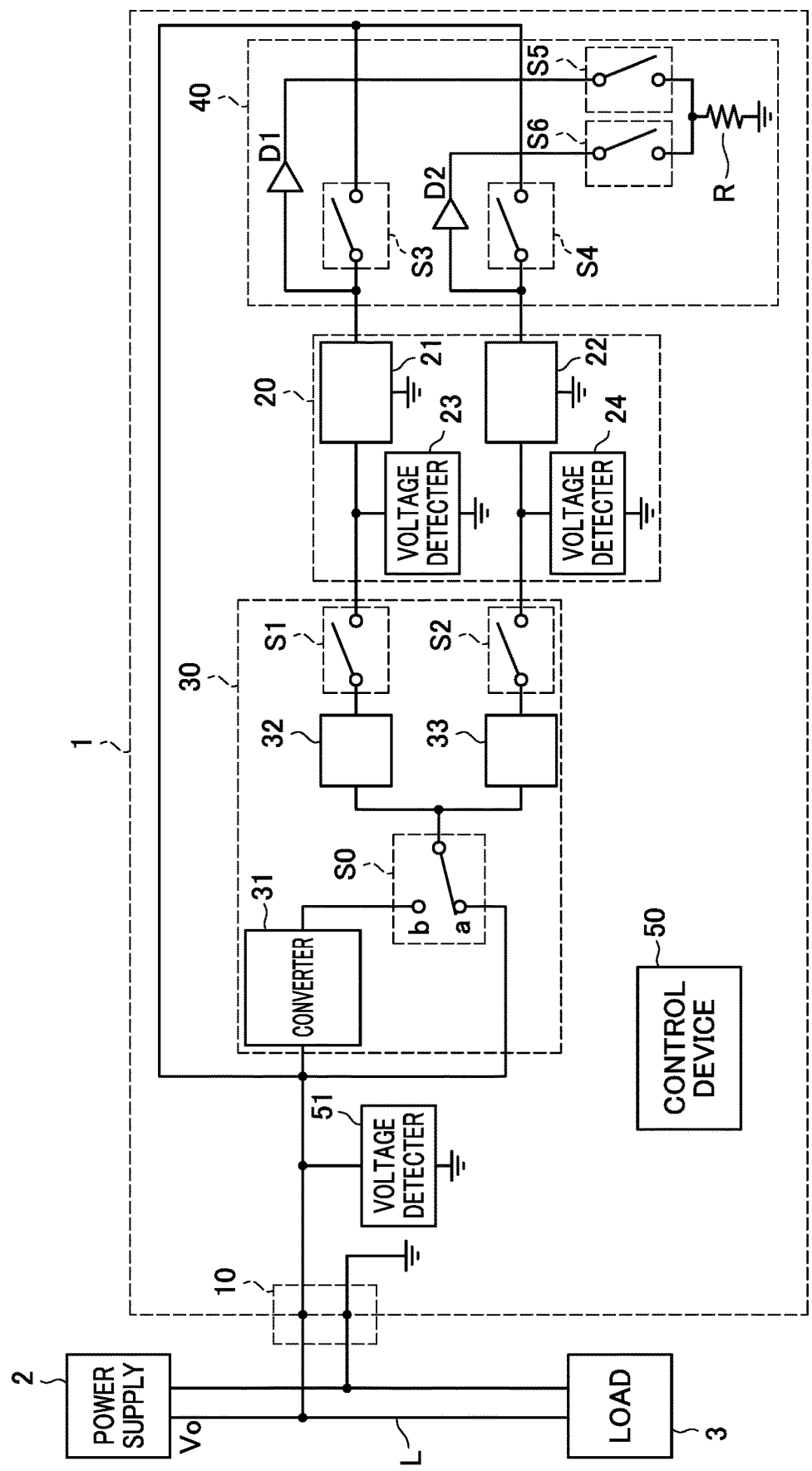
FIG. 1 is a circuit diagram of a backup power supply device according to an embodiment.

An embodiment of the present disclosure will be described below with reference to the drawings. The present disclosure is not limited to the embodiment described below, and various modifications are possible within the scope of the disclosure described in the claims.

<Configuration of Backup Power Supply Device>

A backup power supply device 1 according to an embodiment will be described with reference to the drawings. As shown in FIG. 1, the backup power supply device 1 is a device which is connected in parallel to a power supply 2 as a main power supply and supplies power to a load device 3 in order to continue the operation of the load device 3 when power supply from the power supply 2 to the load device 3 is interrupted due to a power failure or the like. The power supply 2 is, for example, a power supply device that outputs DC power of an output voltage V0 by power feeding from a commercial power source. The load device 3 is an electric device that operates with DC power of the voltage V0. In this embodiment, the voltage V0 is, for example, 26.2 to 28.8V.

The backup power supply device 1 includes input/output terminals 10, a battery unit 20, a charging circuit 30, a discharging circuit 40, and a control device 50.

The input/output terminals 10 are connected to a power supply line L for supplying power from the power supply 2 to the load device 3. DC power of the voltage V0 is supplied to the input/output terminals 10. In the present embodiment, the input voltage V0 at the input/output terminals 10 of the backup power supply device 1 is equal to the output voltage V0 of the power supply 2.

The battery unit 20 includes a first battery pack 21 and a second battery pack 22. The first and second battery packs 21, 22 are connected in parallel to each other. Each of the battery packs 21 and 22 is formed by connecting a plurality of alkaline secondary battery cells such as nickel-hydrogen secondary batteries in series or in parallel. The rated voltage of each of the battery pack 21 and 22 is equal to the voltage V0 of the power supply. Further, each of the battery packs 21 and 22 has a full charge voltage higher than the rated voltage. The battery unit 20 includes a first voltage detection unit 23 for detecting a first battery voltage across the first battery pack 21, a second voltage detection unit 24 for detecting a second battery voltage across the second battery pack 22, an ammeter (not shown) for detecting the charging current to each of the battery packs 21 and 22, and a thermometer (not shown) for detecting the temperature of the battery unit 20.

The charging circuit 30 is a circuit for charging the first and second battery packs 21 and 22, and includes a DC/DC converter 31, a selector switch S0, first and second constant current control circuits 32 and 33, and first and second charging switches S1, S2. The DC/DC converter 31 is a voltage converter for boosting the output voltage V0 from the power supply 2 to the full charge voltages of the battery packs 21 and 22. The DC/DC converter 31 is connected to the input/output terminals 10 on the input side thereof, and is connected to the battery unit 20 via the selector switch S0 on the output side thereof. The DC/DC converter 31 is selectively and electrically connected to the battery unit 20 by switching the selector switch S0.

In the present embodiment, the DC/DC converter 31 is an input/output isolated type DC/DC converter. When the selector switch S0 is set at a contact "a", the DC/DC converter 31 is not connected to the battery unit 20, and the input/output terminals 10 are directly connected to the battery unit 20. On the other hand, when the selector switch S0 is set at a contact "b", the DC/DC converter 31 is connected to the battery unit 20, and a voltage suitable for full charge is applied to the battery unit 20.

The first charging switch S1 is a switch for switching on/off charging of the first battery pack 21. The first charging switch S1 has one end which is connected to the selector switch S0 via the first constant current control circuit 32, and the other end which is connected to the first battery pack 21. When the first charging switch S1 is turned ON, the first battery pack 21 is charged with constant current from the first constant current control circuit 32.

The second charging switch S2 is a switch for switching on/off charging of the second battery pack 22. The second charging switch S2 has one end which is connected to the selector switch S0 via the second constant current control circuit 33, and the other end which is connected to the second battery pack 22. When the second charging switch S2 is turned ON, the second battery pack 22 is charged with constant current from the second constant current control circuit 33.

The first and second constant current control circuits 32 and 33 are control circuits for supplying constant current to the battery packs 21 and 22 to which the first and second constant current control circuits 32 and 33 are respectively connected. The first and second charging switches S1 and S2 are set to ON/OFF with control signals from the control device 50 described later.

The discharging circuit 40 includes a first discharging switch S3, a second discharging switch S4, and a discharging resistor R. The first discharging switch S3 is a switch for switching on/off discharging from the first battery pack 21 to the load device 3. The first discharging switch S3 has one end which is connected to the first battery pack 21, and the other end which is connected to the input/output terminals 10. When the first discharging switch S3 is set to ON, the first battery pack 21 is set to be capable of discharging to the load device 3.

The second discharging switch S4 is a switch for switching on/off discharging of the second battery pack 22. The second discharging switch S4 has one end which is connected to the second battery pack 22, and the other end which is connected to the input/output terminals 10. When the second discharging switch S4 is set to ON, the second battery pack 22 is set to be capable of discharging to the load device 3.

The discharging resistor R has one end which is connected to the first battery pack 21 via a first auxiliary switch S5 and also connected to the second battery pack 22 via a second auxiliary switch S6. The discharging resistor R has the other end which is connected to a reference potential. Therefore, when the first auxiliary switch S5 is set to ON, the first battery pack 21 discharges to the discharging resistor R. On the other hand, when the second auxiliary switch S6 is set to ON, the second battery pack 22 discharges to the discharging resistor R. Further, a diode D1 is inserted between the first auxiliary switch S5 and the first battery pack 21. The diode D1 has an anode connected to the first battery pack 21, and a cathode connected to the first auxiliary switch S5. Furthermore, a diode D2 is inserted between the second auxiliary switch S6 and the second battery pack 22. The diode D2 has an anode connected to the second battery pack 22, and a cathode connected to the second auxiliary switch S6.

The control device 50 includes a microcomputer as a control unit, and controls the charging circuit 30 and the discharging circuit 40 based on the input voltage V0 at the input/output terminals 10, the first battery voltage V1 of the first battery pack 21, and the second battery voltage V2 of the second battery pack 22. Specifically, the control device 50 has a voltage detection unit 51 for detecting the input voltage V0, and compares the input voltage V0, the first battery voltage V1 of the first battery pack 21, and the second battery voltage V2 of the second battery pack 22 as comparison means. Based on this comparison result, the control device 50 outputs control signals for controlling ON/OFF of the selector switch S0, the first charging switch S1, the second charging switch S2, the first discharging switch S3, the second discharging switch S4, the first auxiliary switch S5, and the second auxiliary switch S6.

<Charging/Discharging Control of Backup Power Supply Device>

The charging/discharging control for the battery unit 20 to be executed by the control device 50 will be described with reference to FIG. 2. FIG. 2 is a time chart showing the charging/discharging control of the backup power supply device 1.

At time t1, charging of the first and second battery packs 21 and 22 is started. At this time, when both the first battery voltage V1 of the first battery pack 21 and the second battery voltage V2 of the second battery pack 22 are lower than the output voltage V0 of the power supply 2, the control device 50 switches the selector switch S0 to the contact "a" and turns the first and second charging switches S1 and S2 to ON to charge the first battery pack 21 and the second battery pack 22 under the constant current control based on the output voltage V0 from the power supply 2. Further, the first and second discharge switches S3 and S4 are set to ON so that discharging from the first battery pack 21 and the second battery pack 22 to the load device 3 is allowable in preparation for a power failure. Both the first and second auxiliary switches S5 and S6 are set to OFF-state. Therefore, if the power supply from the power supply 2 stops, power supply from the backup power supply device 1 to the load device 3 is started without causing any instantaneous power failure, and the power supply to the load device 3 is continued.

When the battery voltages V1 and V2 of the battery packs 21 and 22 increase in accordance with charging and approach the output voltage V0 of the power supply 2, the charging current gradually decreases. When control device 50 detects a decrease in charging current, the control device 50 switches the selector switch S0 to the contact "b" at time t2 to supply power from power supply 2 to the DC/DC converter 31 and boost the voltage, whereby the first and second battery packs 21 and 22 are charged under the constant current control based on a full charge voltage higher than the voltage V0. At this time, both the first and second discharging switches S3 and S4 are set to ON-state. Therefore, when the power supply from the power supply 2 stops, the power supply from the backup power supply device 1 to the load device 3 is started without causing any instantaneous power failure, and the power supply to the load device 3 is continued.

Next, at time t3, when the power supply voltages V1 and V2 of the battery packs 21 and 22 exceed the output voltage V0, both the first and second discharging switches S3 and S4 are switched to OFF. Therefore, as the discharge from the battery unit 20 to the load device 3 is stopped, the electric charges charged in the battery packs 21 and 22 do not flow into the load device 3. On the other hand, charging of the first and second battery packs 21 and 22 is continued. Therefore, when the power supply from the power supply 2 stops after time t3, the control device 50 detects this power failure and switches the first and second discharging switches S3 and S4 to ON, thereby causing the battery packs 21 and 22 to discharge to the load device 3. Therefore, a slight instantaneous power failure occurs.

At time t4, when either one of the first and second battery voltages V1 and V2 of the first and second battery packs 21 and 22 exceeds a dischargeable upper limit voltage that can be discharged to the load device 3, for example, when the first battery voltage V1 of the first battery pack 21 exceeds the upper limit voltage earlier, only the second charging switch S2 is set to OFF to stop charging of the second battery pack 22 and continue charging of the first battery pack 21. By turning the second charging switch S2 to OFF, the battery voltage V2 of the second battery pack 22 is kept equal to or less than the upper limit voltage. Therefore, when the power supply from the power supply 2 stops, the control device 50 switches the second discharging switch S4 to ON, which makes it possible to supply power from the second battery pack 22 to the load device 3. Note that the dischargeable upper limit voltage is a voltage that can be applied across the load device 3, and the dischargeable upper limit voltage is set depending on the specification of the load device 3.

At time t5, when the first battery pack 21 is fully charged, the first battery voltage V1 of the first battery pack 21 reaches a full charge voltage higher than the dischargeable upper limit voltage. Therefore, the first charging switch S1 is switched to OFF to stop charging of the first battery pack 21. Then, the first auxiliary switch S5 is set to ON to cause forced discharging from the first battery pack 21 to the discharging resistor R, thereby dropping the first battery voltage V1 to the upper limit voltage. At this time, if the power supply from the power supply 2 to the load device 3 stops, the battery voltage V2 of the second battery pack 22 is equal to or less than the upper limit voltage, so that it is possible to supply power from the second battery pack 22 to the load device 3 by switching the second discharging switch S4 to ON.

At time t6, when the first battery voltage V1 of the first battery pack 21 falls below the upper limit voltage, the first auxiliary switch S5 is switched to OFF to stop forced discharging. Then, the second charging switch S2 is set to ON to start charging of the second battery pack 22. At this time, if the power supply from the power supply 2 stops, the control device 50 that has detected the power failure of the power supply 2 switches only the first discharging switch S3 to ON, whereby it is possible to supply power to the load device 3 from the first battery pack 21 whose battery voltage is equal to or less than the upper limit voltage.

At time t7, when the second battery pack 22 is fully charged, that is, when the second battery voltage V2 of the second battery pack 22 reaches the full charge voltage, charging of the second battery pack 22 is stopped.

Next, the second auxiliary switch S6 is set to ON to cause forced discharging from the second battery pack 22 to the discharging resistor R. At this time, if the power supply from the power supply 2 stops, the control device 50 detects stoppage of the power supply from the power supply 2 and then switches only the first discharging switch S3 to ON, whereby it is possible to supply power to the load device 3 from the first battery pack 21 whose battery voltage is equal to or less than the upper limit voltage.

At time t8, when the second battery voltage V2 of the second battery pack 22 drops to the upper limit voltage due to forced discharging, the second auxiliary switch S6 is set to OFF to stop forced discharging. At this time, both the first and second battery packs 21 and 22 are fully charged, and enter a standby state in preparation for stoppage of power supply from the power supply 2. Since both the battery voltages V1 and V2 are higher than the output voltage V0 of the power supply 2, both the first and second discharging switches S3 and S4 are kept in an OFF-state. However, if the power supply from the power supply 2 stops, the control device 50 detects stoppage of the power supply from the power supply 2 and then switches one or both of the first discharging switch S3 and the second discharging switch S4 to ON, whereby it is possible to supply power from the battery unit 20 to the load device 3.

Furthermore, at time t9, when the first and second battery voltages V1 and V2 of the first and second battery packs 21 and 22 fall below the output voltage V0 of the power supply 2, the first and second discharging switches S3 and S4 are switched to ON-state, which allows discharging from the backup power supply device 1 to the load device 3 to be performed. In this case, power can be supplied from the backup power supply device 1 to the load device 3 without causing any instantaneous power failure.

After time t7, no charging is performed on the battery unit 20. In the present embodiment, at time t8, the selector switch is switched from the contact "b" to the contact "a" to disconnect the DC/DC converter 31 from the charging circuit 30. This switching timing is not limited to the time t8, but the above may be performed at any appropriate timing insofar as the switching timing is after the time t7.

As described above, during the period from the time t3 to the time t9 when the battery voltages V1 and V2 of the battery packs 21 and 22 are higher than the output voltage V0 of the power supply 2, both the first and second discharging switches S3 and S4 are set to OFF to stop the discharging from the battery unit 20 to the load device 3. Therefore, if no power failure of the power supply 2 occurs, the battery packs 21 and 22 constituting the battery unit 20 can be fully charged in a short time. Therefore, the discharging switch OFF period from the time t3 to the time t9 can be shortened.

Further, in the period from the time t3 to the time t9, specially during the period from the time t3 to the time t4 and the period from the time t8 to the time t9, all of the battery voltages V1 and V2 of the first and second battery packs 21 and 22 are equal to or less than the upper limit voltage. Therefore, for example, if the power supply from the power supply 2 stops due to a power failure, both the first and second discharging switches S3 and S4 are switched to ON by the control signals from the control device 50, which makes it possible to discharge to the load device 3 from any of the first and second battery packs 21 and 22, so that a large amount of electric power that can be supplied to the load device 3 can be ensured.

Furthermore, during the period from the time t4 to the time t8, the battery packs 21 and 22 are alternately charged, and the battery voltage of any one of the battery packs exceeds the upper limit voltage due to charging, so that it is impossible to cause the any one of the battery pack to discharge to the load device 3. The battery voltage of the other battery pack is maintained to be equal to or less than the upper limit voltage without charging the other battery pack. Therefore, if the power supply from the power supply 2 stops due to a power failure, the discharging switch corresponding to the battery pack whose battery voltage is equal to or less than the upper limit voltage is switched to ON with the control signal from the control device 50. Therefore, it is possible to cause this battery pack to discharge to the load device 3. As described above, during the period from the time t4 to the time t8, preparations are made for power failures by securing a dischargeable battery pack.

The number of battery packs to be connected in parallel is not limited to two, and it may be an appropriate plural number. In this case, a plurality of battery packs are divided into at least two groups, and the battery voltages of the battery packs of one of the group are kept to be equal to or less than the upper limit voltage while the battery packs of the other group are being charged with the battery voltages thereof exceeding the upper limit voltage. As a result, even if the power supply from the power supply 2 is interrupted, it is possible to cause the backup power supply device 1 to discharge to the load device 3.

As described above, when the battery voltage of the battery pack exceeds the output voltage V0 of the power supply, both the first and second discharging switches are switched OFF to stop discharging from the battery unit to the load device. Therefore, if a power failure does not occur in the power supply 2 during charging of the battery packs 21 and 22, it is possible to shorten the charging time required until the backup power supply device 1 is ready for being in the discharging standby state by fully charging each battery unit, as compared with a case where the first and second discharge switches S3 and S4 are kept to ON at all times.

Further, the battery voltage of one battery pack is maintained to be equal to or less than the upper limit voltage while the other battery pack is being charged so as to reach the full charge voltage with the battery voltage thereof exceeding the upper limit voltage. Accordingly, if a power failure occurs in the power supply 2, power supply to the load device 3 is enabled. Therefore, the time for which an instantaneous power failure occurs can be shortened.

EXPLANATION OF REFERENCE SIGNS 1 backup power supply device
2 main power supply
3 load device
21, 22 battery pack
30 charging circuit
50 control device
S3 first discharging switch
S4 second discharging switch

The invention claimed is:

1. A backup power supply device for supplying power to a load device when power supply from a main power supply to the load device stops, comprising: first and second battery packs each including a secondary battery cell and connected in parallel to each other; a charging circuit for charging the first and second battery packs with power from the main power supply; a first discharging switch that connects and discharges the first battery pack to the load device; a second discharging switch that connects and discharges the second battery pack to the load device; and a control unit for controlling the charging circuit and the first and second discharging switches, wherein: the control unit comprises comparison circuit for comparing a first battery voltage of the first battery pack, a second battery voltage of the second battery pack, and an output voltage from the main power supply, wherein-when the first battery voltage and the second battery voltage are lower than the output voltage, the control unit sets the first discharging switch and the second discharging switch to an ON-state, wherein when the first battery voltage exceeds the output voltage of the main power supply due to charging, the control unit sets the first discharging switch and the second discharging switch to an OFF-state to continue charging of the first battery pack, wherein when the first battery voltage exceeds a dischargeable upper limit voltage higher than the output voltage due to charging, the control unit continues the charging of the first battery pack without charging the second battery pack, and stops the charging of the first battery pack when the first battery voltage reaches a full charge voltage higher than the upper limit voltage, and thereafter, the control unit starts charging of the second battery pack after the first battery voltage has fallen below the upper limit voltage, then the control unit stops the charging of the second battery pack when the second battery voltage reaches the full charge voltage, and the control unit switches the first and second discharging switches to ON after the second battery voltage has fallen below the output voltage.

2. The backup power supply device according to claim 1, further comprising a discharging resistor for forcibly dropping a battery voltage of the fully charged first battery pack or second battery pack from the full charge voltage to the upper limit voltage.

3. The backup power supply device according to claim 1, wherein the secondary battery cell is a nickel-hydrogen battery.

* * * * *